US011713726B2

(12) United States Patent
Koike

(10) Patent No.: US 11,713,726 B2
(45) Date of Patent: Aug. 1, 2023

(54) CONTROL METHOD AND CONTROL DEVICE FOR INTERNAL COMBUSTION ENGINE

(71) Applicant: NISSAN MOTOR CO., LTD., Yokohama (JP)

(72) Inventor: Tomoyuki Koike, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/291,377

(22) PCT Filed: Nov. 6, 2018

(86) PCT No.: PCT/IB2018/001331
§ 371 (c)(1),
(2) Date: May 5, 2021

(87) PCT Pub. No.: WO2020/095081
PCT Pub. Date: May 14, 2020

(65) Prior Publication Data
US 2022/0003175 A1 Jan. 6, 2022

(51) Int. Cl.
*F02D 15/02* (2006.01)
*B63H 21/21* (2006.01)
(Continued)

(52) U.S. Cl.
CPC ............ *F02D 15/02* (2013.01); *B63H 21/21* (2013.01); *B63H 23/30* (2013.01); *F02B 75/047* (2013.01);
(Continued)

(58) Field of Classification Search
CPC ................ B60W 10/02; B60W 10/06; B60W 2030/1809; B60W 30/18018;
(Continued)

(56) References Cited

U.S. PATENT DOCUMENTS

| 2008/0098990 A1 | 5/2008 | Hiyoshi et al. |
| 2013/0055990 A1 | 3/2013 | Kamada |
| 2014/0261336 A1* | 9/2014 | Takahashi ............... F02D 23/00 123/48 R |
| 2015/0122226 A1* | 5/2015 | Kamada ................. F02D 15/02 123/48 R |

FOREIGN PATENT DOCUMENTS

| DE | 10 2010 032 488 A1 | 2/2012 |
| EP | 3 042 816 A1 | 7/2016 |

(Continued)

*Primary Examiner* — Grant Moubry
*Assistant Examiner* — Ruben Picon-Feliciano
(74) *Attorney, Agent, or Firm* — Foley & Lardner LLP

(57) ABSTRACT

An internal combustion engine (1) for a vehicle is equipped with a variable compression ratio mechanism (2) capable of changing the mechanical compression ratio. An idle stop, which is for automatically stopping the internal combustion engine (1) when the vehicle stops, and a sailing stop, which is for stopping the internal combustion engine (1) in conjunction with the release of a forward clutch (8) during inertial travel, are carried out. A target compression ratio during normal travel is set on the basis of the load and rotation speed of the internal combustion engine (1). During an idle stop the target compression ratio is set to an idle stop restart compression ratio ($\varepsilon is$). During a sailing stop the target compression ratio is set to a sailing stop restart compression ratio ($\varepsilon ss$). The sailing stop restart compression ratio ($\varepsilon ss$) is lower than the idle stop restart compression ratio ($\varepsilon is$).

5 Claims, 6 Drawing Sheets

(51) Int. Cl.
  *B63H 23/30*   (2006.01)
  *F02B 75/04*   (2006.01)
  *F02D 41/04*   (2006.01)

(52) U.S. Cl.
  CPC ...... *F02D 41/042* (2013.01); *B63H 2021/216* (2013.01)

(58) Field of Classification Search
  CPC .. B63H 2021/216; B63H 21/21; B63H 23/30; F02B 75/047; F02D 15/02; F02D 2200/501; F02D 29/02; F02D 41/042; F02D 41/064; F02N 11/0818; F02N 2300/2002; F02N 5/04
  See application file for complete search history.

(56) References Cited

FOREIGN PATENT DOCUMENTS

| | | |
|---|---|---|
| JP | 2004-293411 A | 10/2004 |
| JP | 2008-111375 A | 5/2008 |
| JP | 2012-225165 A | 11/2012 |
| JP | 2014-196665 A | 10/2014 |
| JP | 2015-206297 A | 11/2015 |
| JP | 2016-113947 A | 6/2016 |
| JP | 2017-8876 A | 1/2017 |
| JP | 2017-210918 A | 11/2017 |
| JP | 2018-91392 A | 6/2018 |
| WO | WO 2016/194605 A1 | 12/2016 |

\* cited by examiner

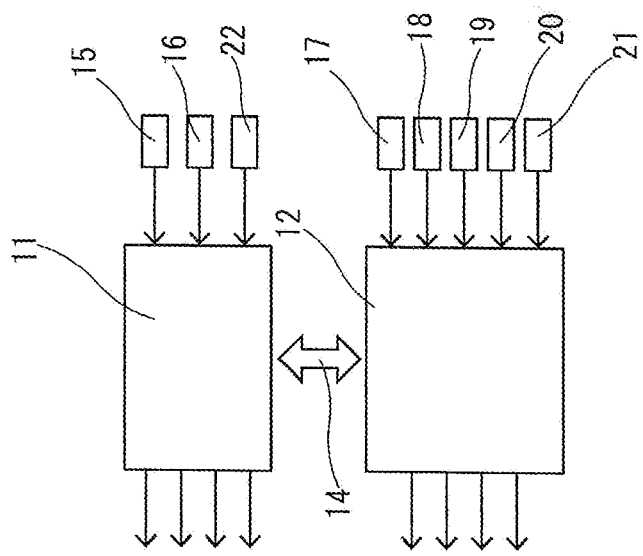
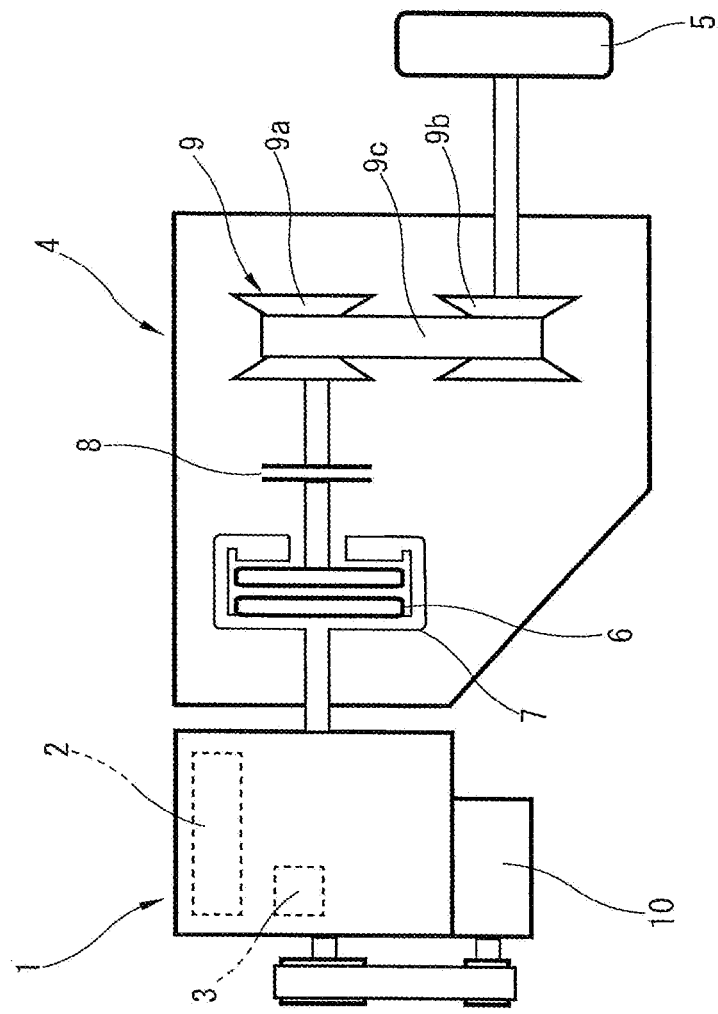
FIG. 1

CONTROL METHOD AND CONTROL DEVICE FOR INTERNAL COMBUSTION ENGINE

TECHNICAL FIELD

The present invention relates to a control method and a control device for an internal combustion engine including a variable compression ratio mechanism structured to vary a mechanical compression ratio, and particularly relates to compression ratio control in case of implementing stop of internal combustion engine called sailing stop during coasting travel of a vehicle.

BACKGROUND ART

There are various kinds of known variable compression ratio mechanisms in a field of internal combustion engine, such as a variable compression ratio mechanism structured to vary a mechanical compression ratio by varying relative positional relation between a piston and a cylinder, and a variable compression ratio mechanism structured to vary a volume of a combustion chamber by using an auxiliary piston and an auxiliary cylinder.

For an internal combustion engine including such a variable compression ratio mechanism, it is desirable to increase a mechanical compression ratio (hereinafter referred to also as a compression ratio simply) as much as possible in view of improvement in thermal efficiency. However, such increase in compression ratio is likely to cause knockings in a high engine load region. Accordingly, it is general to set a target compression ratio depending on operation conditions of the internal combustion engine, i.e. an engine load and an engine speed, such that the target compression ratio decreases with increase in engine load.

Patent Document 1 discloses setting a target compression ratio for automatic restart of an internal combustion engine to be a restart target compression ratio lower than a target compression ratio for normal operation, wherein the internal combustion engine has a function of so-called idle stop to automatically stop the internal combustion engine during vehicle stop at a place such as a crossroads and then restart the internal combustion engine in response to vehicle start.

Besides the idle stop mentioned above, the automatic stop of internal combustion engine may be performed by so-called sailing stop in which during coasting travel the internal combustion engine is detached from a drive system and then stopped. The internal combustion engine that has been stopped by the sailing stop is restarted in response to satisfaction of a predetermined sailing-stop termination condition such as depression of an accelerator pedal (i.e. request for reacceleration).

In the engine restart subsequent to the idle stop, it is desirable to avoid a rapid rise in torque (i.e. a rapid variation in acceleration of a vehicle) because the vehicle is generally started from a stationary state. In contrast, in the engine restart subsequent to the sailing stop, it is generally desirable to quickly raise a torque to satisfy a request for reacceleration from a driver.

Patent Document 1 does not disclose an appropriate control for such engine restart subsequent to the sailing stop.

PRIOR ART DOCUMENT(S)

Patent Document(s)

Patent Document 1: JP 2017-8876 A

SUMMARY OF THE INVENTION

According to one aspect of the present invention, in a control method or a control device for an internal combustion engine, a target compression ratio is set to a basic target compression ratio determined depending on operation conditions of the internal combustion engine, during operation of the internal combustion engine. The target compression ratio is set to an idle stop restart compression ratio in preparation for engine restart subsequent to termination of idle stop, in conjunction with implementation of the idle stop. The target compression ratio is set to a sailing stop restart compression ratio in preparation for engine restart subsequent to termination of sailing stop, in conjunction with implementation of the sailing stop, wherein the sailing stop restart compression ratio is different from the idle stop restart compression ratio.

The idle stop restart compression ratio and the sailing stop restart compression ratio are different in value from each other, so as to be appropriate for the engine restart subsequent to the idle stop and the engine restart subsequent to the sailing stop respectively. This allows the engine restart to be implemented under compression ratios appropriate for the respective situations.

BRIEF DESCRIPTION OF THE DRAWINGS

FIG. 1 is an illustrative view showing configurations of a vehicle including an internal combustion engine according to the present invention.

MODE(S) FOR CARRYING OUT THE INVENTION

Figure 2:
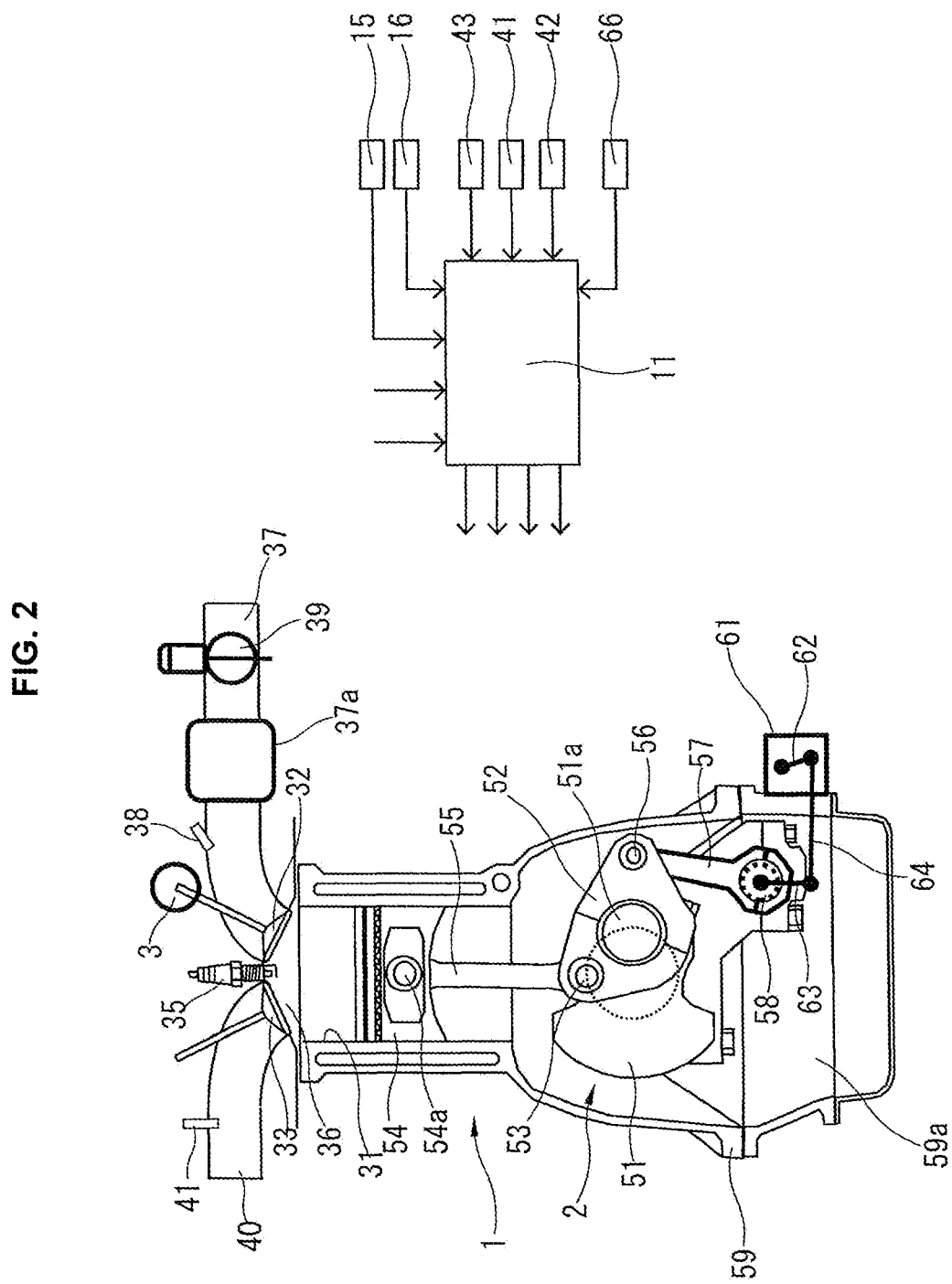
FIG. 2 is an illustrative view showing configurations of the internal combustion engine including a variable compression ratio mechanism.

The following details an embodiment of the present invention with reference to the drawings.

FIG. 1 schematically illustrates configurations of a vehicle including an internal combustion engine 1 according to the present invention. Internal combustion engine 1 is, for example, a spark-ignition type internal combustion engine of four-stroke cycle which uses fuel such as gasoline, and includes a variable compression ratio mechanism 2 structured to vary a mechanical compression ratio (detailed below) and a variable valve timing mechanism 3 structured to vary valve timing of intake valves. Moreover, internal combustion engine 1 includes a starter motor 10 for engine start which is composed of a motor generator.

Internal combustion engine 1 outputs rotation to be transferred to a drive wheel 5 via an automatic transmission 4. Automatic transmission 4 includes: a torque converter 7 including a lock-up clutch 6; a forward clutch 8; and a belt type Continuously Variable Transmission (CVT) 9. CVT 9 includes a primary pulley 9a, a secondary pulley 9b, and a belt 9c wound onto these pulleys to connect them, and is structured to continuously vary a transmission ratio due to variation in winding radius of belt 9c which is performed by axially moving a movable conical plate of primary pulley 9a and a movable conical plate of secondary pulley 9b with oil pressure. Forward clutch 8 is interposed between an output shaft of torque converter 7 and an input shaft of CVT 9. In a state that forward clutch 8 is engaged, the rotation of internal combustion engine 1 is transferred from torque converter 7 to CVT 9. When performing sailing stop described below, forward clutch 8 is released to block power transmission between internal combustion engine 1 and a drive system including CVT 9 and drive wheel 5.

Although FIG. 1 schematically shows forward clutch 8, forward clutch 8 may be configured in any form and may be disposed at a position other than one shown in the drawing, provided that forward clutch 8 is disposed somewhere on a power transmission path between internal combustion engine 1 and drive wheel 5. As an example, forward clutch 8 is configured as a part of a forward/backward switching mechanism structured to perform switching between forward travel and backward travel of the vehicle. The forward/backward switching mechanism includes a backward brake not shown, in addition to forward clutch 8. In a state that the backward brake is engaged, the forward/backward switching mechanism reversely transfers rotation inputted from torque converter 7, to CVT 9. Moreover, the drive system of the vehicle may appropriately include additional components such as a speed reduction gear and a differential gear, which are omitted in FIG. 1 because of relatively low relevance to the present invention.

The vehicle according to the present embodiment includes control devices including an engine controller 11 controlling the internal combustion engine 1 and a transmission controller 12 controlling the automatic transmission 4. Engine controller 11 and transmission controller 12 communicate with each other via an in-vehicle network 14 such as a Controller Area Network (CAN), and exchange various monitor signals and control signals. Engine controller 11 and transmission controller 12 may be integrated into one controller.

Engine controller 11 and transmission controller 12 appropriately receive signals such as: a signal from an accelerator opening sensor 15 monitoring an accelerator pedal opening degree APO; a signal from an engine speed sensor 16 monitoring an engine speed Ne of internal combustion engine 1; a signal from a vehicle speed sensor 17 monitoring a vehicle speed VSP; a signal from a brake fluid pressure sensor 18 monitoring a brake fluid pressure corresponding to an amount of brake pedal operation; a signal from an inhibitor switch 19 monitoring a position of a shift lever; a signal from a primary rotational speed sensor 20 monitoring a rotational speed Npri of primary pulley 9a of CVT 9; a signal from a secondary rotational speed sensor 21 monitoring a rotational speed Nsec of secondary pulley 9b of CVT 9; and a signal from a water temperature sensor 22 monitoring a temperature of cooling water in internal combustion engine 1. In general, each of the signals is inputted directly to a corresponding one of engine controller 11 and transmission controller 12 that needs the each of the signals. Some of the signals are indirectly inputted from one of the controllers to the other via in-vehicle network 14.

Transmission controller 12 stores a target transmission ratio map employing vehicle speed VSP and accelerator pedal opening degree APO as parameters, such that a transmission ratio of automatic transmission 4, i.e. a transmission ratio of CVT 9, is controlled to agree with a target transmission ratio determined based on the target transmission ratio map. In addition, the transmission may be a stepped transmission structured to perform speed change among a plurality of speed change levels.

FIG. 2 shows system configurations of internal combustion engine 1 including variable compression ratio mechanism 2 and variable valve timing mechanism 3. Internal combustion engine 1 is a four-stroke cycle spark-ignition type internal combustion engine including the variable compression ratio mechanism 2 employing a multi-link type piston-crank mechanism. Internal combustion engine 1 includes a pair of intake valves 32 and a pair of exhaust valves 33 in a ceiling wall of each cylinder 31, and includes a spark plug 35 in a central region surrounded by intake valves 32 and exhaust valves 33.

Intake valves 32 are provided with variable valve timing mechanism 3 structured to perform variable control on valve timing of intake valves 32. Although variable valve timing mechanism 3 according to the present embodiment is configured to simultaneously retard valve opening timing and valve closing timing by retarding a phase of a camshaft, it may be in any form provided that variable valve timing mechanism 3 is capable of retarding at least the valve closing timing. Such variable valve timing mechanism includes various known types, and is not limited to a specific type of valve timing mechanism.

Variable valve timing mechanism 3 includes a sprocket concentrically disposed at a front end of the camshaft, and further includes a hydraulic rotational actuator structured to cause the sprocket and the camshaft to rotate relatively to each other within a predetermined angle range. The sprocket is in linkage with the camshaft via a timing chain or a timing belt not shown. Accordingly, the relative rotation between the sprocket and the camshaft causes the camshaft to vary in phase with respect to a crank angle. The camshaft under variable control of variable valve timing mechanism 3 has an actual control position (which corresponds to actual valve timing) monitored by a cam angle sensor 43 structured to monitor a rotational position of the camshaft. Cam angle sensor 43 outputs a monitor signal to engine controller 11. Then, variable valve timing mechanism 3 is controlled under closed loop control such that the actual control position monitored by cam angle sensor 43 agrees with a target control position determined depending on engine operation conditions.

Via intake valves 32, a combustion chamber 36 is connected to an intake passage 37 in which a fuel injection valve 38 for each cylinder is disposed. In the present invention, internal combustion engine 1 may be a cylinder injection type one in which fuel is injected directly into each cylinder 31. Intake passage 37 is provided with an electronically-controlled type throttle valve 39 having an opening degree controlled depending on a control signal from engine controller 11, wherein the throttle valve 39 is disposed upstream with respect to an intake collector 37a of intake passage 37.

Via exhaust valves 33, combustion chamber 36 is connected to an exhaust passage 40 in which an air-fuel ratio sensor 41 monitoring an air-fuel ratio is disposed.

Engine controller 11 receives a signal from air-fuel ratio sensor 41 and a signal from an air flow meter 42 monitoring an amount of intake air in an upstream region in intake passage 37, in addition to the signals from various sensors described above. Based on these monitor signals, engine controller 11 optimally controls a fuel injection amount and fuel injection timing of fuel injection valve 38, ignition timing of spark plug 35, the mechanical compression ratio of variable compression ratio mechanism 2, the valve timing of intake valves 32, the opening degree of throttle valve 39, etc.

Variable compression ratio mechanism 2 employs, for example, a known multi-link type piston-crank mechanism as disclosed in Patent Document 1, and mainly includes: a lower link 52 rotatably supported by a crank pin 51a of a crank shaft 51; an upper link 55 connecting an upper pin 53 formed at a first end of lower link 52 to a piston pin 54a of a piston 54; a control link 57 including a first end connected to a control pin 56 formed at a second end of lower link 52; and a control shaft 58 swingably supporting a second end of control link 57. Each of crank shaft 51 and control shaft 58 is rotatably supported by a bearing not shown, in a crank case 59a disposed in a lower part of a cylinder block 59. Control shaft 58 includes an eccentric shaft structured to move with rotation of control shaft 58, and the second end of control link 57 is, in detail, fitted together with the eccentric shaft of control shaft 58. The rotation of control shaft 58 causes variation in top dead center position of piston 54 in a vertical direction, and thereby causes variation in mechanical compression ratio in variable compression ratio mechanism 2.

According to the present embodiment, variable compression ratio mechanism 2 is provided with an electric actuator 61 disposed on an outer periphery of crank case 59a and structured to perform variable control on the compression ratio in variable compression ratio mechanism 2. Electric actuator 61 has a rotational central axis parallel with crank shaft 51, and is in linkage with control shaft 58 via: a first arm 62 fixed to an output rotational shaft of electric actuator 61; a second arm 63 fixed to control shaft 58; and an intermediate link 64 connecting first arm 62 to second arm 63. Moreover, electric actuator 61 includes an electric motor and a transmission arranged in series in the axial direction.

An actual value of the mechanical compression ratio under variable control of variable compression ratio mechanism 2, i.e. an actual compression ratio, is monitored by an actual compression ratio sensor 66. Actual compression ratio sensor 66 is, for example, composed of a sensor such as a rotary potentiometer and a rotary encoder for monitoring a rotational angle of control shaft 58 or a rotational angle of the output rotational shaft of electric actuator 61. In another way, the actual compression ratio may be determined without using a separate sensor, by calculating a rotational amount of the electric motor of electric actuator 61 from a command signal for the electric motor, and then calculating the rotational angle of control shaft 58 from the rotational amount of the electric motor.

Figure 3:
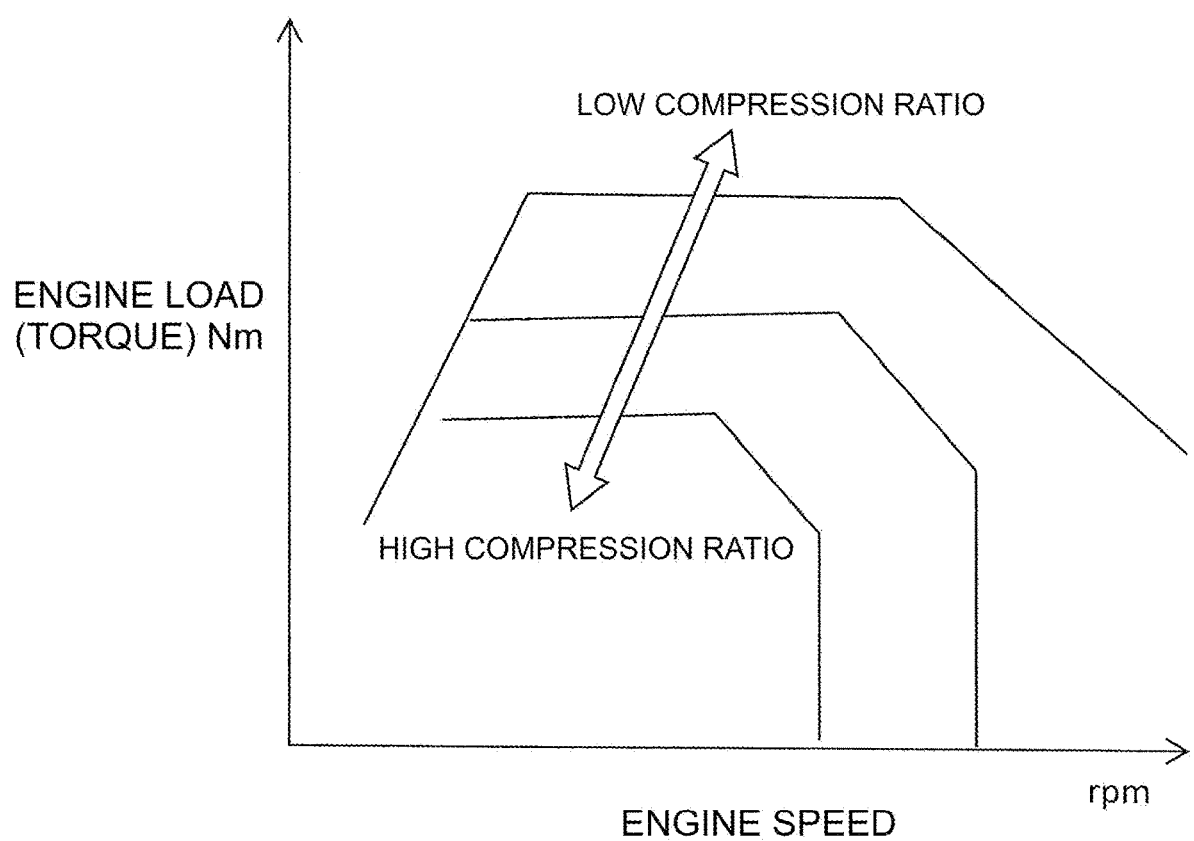
FIG. 3 is a characteristic chart showing characteristics of a target compression ratio map for normal operation.

Electric actuator 61 is driven under control of engine controller 11 such that the actual compression ratio determined as described above agrees with a target compression ratio corresponding to the engine operation conditions. Engine controller 11 stores, for example, a target compression ratio map employing an engine load (in other words, a required torque) of internal combustion engine 1 and the engine speed Ne as parameters representing the engine operation conditions, and sets the target compression ratio depending on this map. FIG. 3 schematically shows characteristics of the target compression ratio map. As shown in this drawing, the target compression ratio is basically set to be a high compression ratio, and decrease with increase in engine load for reduction of knockings etc.

The following describes compression ratio control for sailing stop which is a focus of the present invention. The sailing stop is implemented during coasting travel by releasing the forward clutch 8 and thereby detaching the internal combustion engine 1 from drive wheel 5 (i.e. block the power transmission), and then stopping operation of internal combustion engine 1, wherein the coasting travel is caused due to release of the accelerator pedal by a driver during vehicle travel. The implementation of the sailing stop serves to increase a travel distance of the coasting travel and reduce fuel consumption.

The sailing stop is started in response to satisfaction of a start condition given as, for example, simultaneous satisfaction of the following four conditions (i.e. an AND condition).

1. Accelerator OFF (i.e. accelerator pedal opening degree APO being zero)
2. Brake OFF (i.e. release of the brake pedal)
3. Vehicle speed VSP equal to or greater than a predetermined sailing stop permission vehicle speed (e.g. 50 km/h)
4. Other sailing stop permission conditions (e.g. the cooling water temperature, a lubricating oil temperature, air conditioner operation conditions, etc.)

The sailing stop is terminated in response to satisfaction of one of the following sailing stop termination conditions (i.e. OR conditions). In response to the satisfaction of the sailing stop termination conditions, forward clutch 8 is engaged, and internal combustion engine 1 is restarted.

1. Brake ON (i.e. depression of the brake pedal)
2. Accelerator ON (i.e. accelerator pedal opening degree APO greater than zero)
3. Vehicle speed VSP equal to or less than a predetermined sailing stop termination vehicle speed (e.g. 40 km/h)
4. Other sailing stop termination conditions (e.g. the cooling water temperature, the lubricating oil temperature, the air conditioner operation conditions, etc.)

In case that the vehicle includes an inter-vehicular distance monitoring device such as a radar and a camera for monitoring a distance from the other vehicle traveling in front of the vehicle, the sailing stop termination conditions may include an additional condition of "5. Inter-vehicular distance from a vehicle in front which is equal to or less than a predetermined distance".

In restarting the internal combustion engine 1 subsequently to the termination of sailing stop, internal combustion engine 1 rotates naturally in response to the engagement of forward clutch 8 because the vehicle is in travel. Accordingly, the engine restart at that time can be performed without using the starter motor 10 in general. However, the engine restart may be implemented with assistance of starter motor 10.

In addition to the sailing stop, the vehicle according to the present embodiment has a function of idle stop in which internal combustion engine 1 is automatically stopped in conjunction with stop of the vehicle at a crossroads etc. A condition for starting the idle stop may be defined as various combinations of conditions. Basically, the operation of internal combustion engine 1 is stopped when internal combustion engine 1 is determined to be in temporary vehicle stop at a crossroads etc. in response to simultaneous satisfaction of conditions that: accelerator pedal opening degree APO is zero; vehicle speed VSP is zero; and the brake pedal is depressed (i.e. a brake fluid pressure is equal to or greater than a predetermined level). Moreover, other conditions such as the cooling water temperature and a shift position of automatic transmission 4 may be included as additional conditions. After the automatic stop of internal combustion engine 1, internal combustion engine 1 is restarted with assistance of cranking performed by starter motor 10, in response to satisfaction of any one of predetermined idle stop termination conditions such as release of the brake pedal, depression of the accelerator pedal, and a request from the air conditioner.

In restarting the internal combustion engine 1 subsequently to the termination of sailing stop or the termination of idle stop, the target compression ratio of variable compression ratio mechanism 2 is not set based on the target compression ratio map for normal operation shown in FIG. 3, but is set to a predetermined sailing stop restart compression ratio εss or a predetermined idle stop restart compression ratio εis respectively. Specifically, variable compression ratio mechanism 2 during the sailing stop is controlled to achieve the predetermined sailing stop restart compression ratio εss in preparation for the engine restart subsequent to the termination of sailing stop, and then the engine restart subsequent to the termination of sailing stop is implemented under the sailing stop restart compression ratio εss. Variable compression ratio mechanism 2 during the idle stop is controlled to achieve the predetermined idle stop restart compression ratio εis in preparation for the engine restart subsequent to the termination of idle stop, and then the engine restart subsequent to the termination of idle stop is implemented under the idle stop restart compression ratio εis.

In the present invention, the sailing stop restart compression ratio εss and the idle stop restart compression ratio εis are individually set as compression ratios different from each other, although both of them are used for automatic engine restart. For the engine restart subsequent to the termination of idle stop, it is desirable to avoid torque shock and rapid rise in engine speed Ne (i.e. so-called racing) due to the engine restart, because the engine restart is implemented from a state of vehicle stop. Accordingly, the idle stop restart compression ratio εis is set to a compression ratio appropriate for performing the engine restart relatively calmly. On the other hand, for the engine restart subsequent to the termination of sailing stop during the coasting travel, the engine restart is implemented in road noises, travel vibrations, etc. Moreover, in case of the termination of sailing stop due to the depression of the acceleration pedal, acceleration responsiveness is required. Accordingly, the sailing stop restart compression ratio εss is set to a compression ratio appropriate for performing the engine restart with relatively quick rise in torque.

As an example, the idle stop restart compression ratio εis is set to a relatively high compression ratio appropriate for low engine load operation. This serves to achieve the calm engine restart, with minimum amount of fuel and intake air required for the engine restart. On the other hand, the sailing stop restart compression ratio εss is set to a relatively low compression ratio appropriate for high engine load operation. This allows quick shift to the high engine load operation simultaneous with completion of the engine restart, and thereby allows the rapid rise in torque.

The sailing stop restart compression ratio εss for the engine restart subsequent to the termination of sailing stop may be set higher than the idle stop restart compression ratio εis for the engine restart subsequent to the termination of idle stop, in case that different characteristics for the respective engine restarts is required due to difference in specification of the vehicle, in case of being under an influence of the other variable device, and/or in case of being under a specific exceptional condition.

Figure 4:
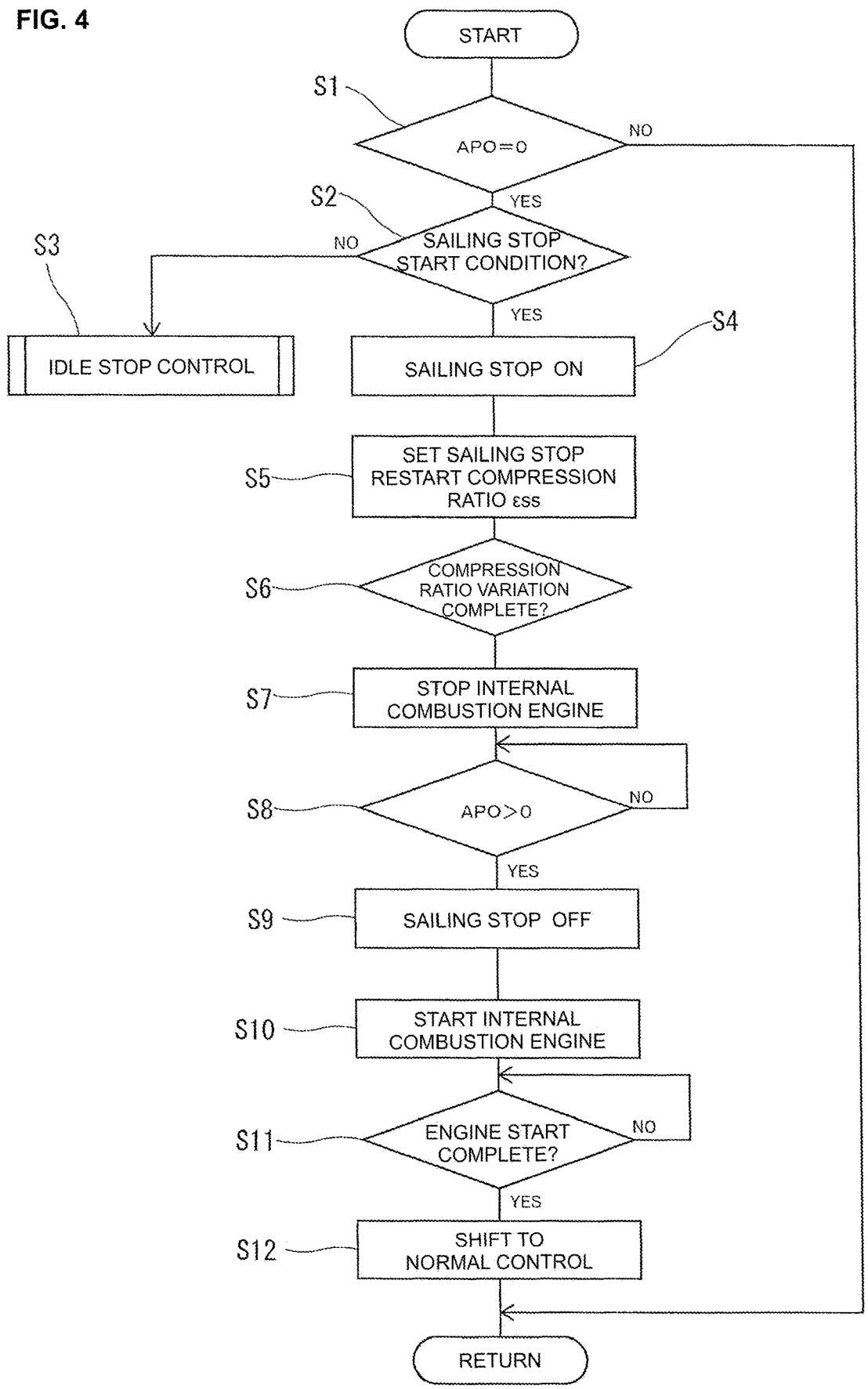
FIG. 4 is a flow chart showing control flow for sailing stop.

FIG. 4 is a flow chart showing control flow for the sailing stop. An entire routine shown in the flow chart is, for example, executed in engine controller 11, and partially in transmission controller 12.

Step 1 (abbreviated as Si in the drawing) is repetitive determination of whether accelerator pedal opening degree APO is zero, based on the monitor signal of accelerator opening sensor 15. If accelerator pedal opening degree APO is determined to be non-zero, the routine terminates directly. In this case, the target compression ratio of variable compression ratio mechanism 2 is set using the target compression ratio map shown in FIG. 3, depending on the engine load and the engine speed Ne of internal combustion engine 1, as described above.

If accelerator pedal opening degree APO is determined to be zero in step 1, step 2 is executed to determine whether the sailing stop start condition is satisfied. If the sailing stop start condition is determined to be unsatisfied, step 3 is executed to shift to control for the idle stop under another routine not shown.

If the sailing stop start condition is determined to be satisfied, step 4 is executed subsequently to step 2, to turn ON a sailing stop flag and output a request for the sailing stop to transmission controller 12. In response to the turning ON of the sailing stop flag, transmission controller 12 releases forward clutch 8 of automatic transmission 4. This causes internal combustion engine 1 to be detached from CVT 9 and drive wheel 5.

Subsequently to step 4, step 5 is executed to set the target compression ratio of variable compression ratio mechanism 2 to the sailing stop restart compression ratio εss being a relatively low compression ratio, and drive the variable compression ratio mechanism 2 in conformance with the sailing stop restart compression ratio εss. Then, step 6 is executed to determine whether the actual compression ratio measured by actual compression ratio sensor 66 agrees with the sailing stop restart compression ratio εss serving as the target compression ratio: i.e., whether variable compression ratio mechanism 2 has completed the variation of compression ratio.

If the actual compression ratio is determined to agree with the sailing stop restart compression ratio εss, step 7 is executed to stop the operation of internal combustion engine 1. In other words, in the present embodiment, the variation of compression ratio by variable compression ratio mechanism 2 is implemented before the operation stop of internal combustion engine 1. Because internal combustion engine 1 employs an oil pump for supply of lubricating oil which is generally a mechanical oil pump driven by crank shaft 51 of internal combustion engine 1, it is favorable in view of durability of variable compression ratio mechanism 2 to complete the compression ratio variation of variable compression ratio mechanism 2 before the rotation of internal combustion engine 1 stops: i.e., before the supply of lubricating oil from the mechanical oil pump stops.

This stop of internal combustion engine 1, i.e. the sailing stop, causes the vehicle to continue the coasting travel with internal combustion engine 1 stopped and with the power transmission blocked at forward clutch 8.

Next, step 8 is executed to repetitively determine whether the sailing stop termination condition(s) is/are satisfied: i.e., whether accelerator pedal opening degree APO is greater than zero. The sailing stop is continued until one of the sailing stop termination conditions is satisfied. For example, if accelerator pedal opening degree APO is determined to be greater than zero as the satisfaction of the sailing stop termination condition, step 9 is executed subsequently to step 8, to turn OFF the sailing stop flag and require transmission controller 12 to terminate the sailing stop. In response to the turning OFF of the sailing stop flag, transmission controller 12 engages forward clutch 8. Then, step 10 is executed to restart internal combustion engine 1: specifically, start fuel injection and ignition.

Thereafter, step 11 is executed to determine whether the restart of internal combustion engine 1 has been completed: in other words, whether internal combustion engine 1 has shifted to self-sustaining operation. In response to the completion of the engine restart, step 12 is executed subsequently to step 11, to restart normal control on internal combustion engine 1.

The idle stop control of step 3, detail of which is omitted in the drawing, is performed by: repetitively determining whether the idle stop start condition is satisfied, i.e., whether the conditions that accelerator pedal opening degree APO is zero, vehicle speed VSP is zero, and the brake pedal is depressed are simultaneously satisfied; and implementing the idle stop, i.e., automatically stopping the internal combustion engine 1, in response to satisfaction of the idle stop start condition. In implementing the idle stop, the target compression ratio of variable compression ratio mechanism 2 is controlled to agree with the idle stop restart compression ratio εis being a relatively high compression ratio, as described above. It is desirable to vary the compression ratio to the idle stop restart compression ratio εis before stopping the internal combustion engine 1. Internal combustion engine 1 is restarted with assistance of the cranking performed by starter motor 10, in response to satisfaction of one of the idle stop termination conditions such as the release of the brake pedal, during the idle stop. In addition, during the idle stop (in detail, during a period in which vehicle speed is approximately equal to zero), lock-up clutch 6 of torque converter 7 is released.

Figure 5:
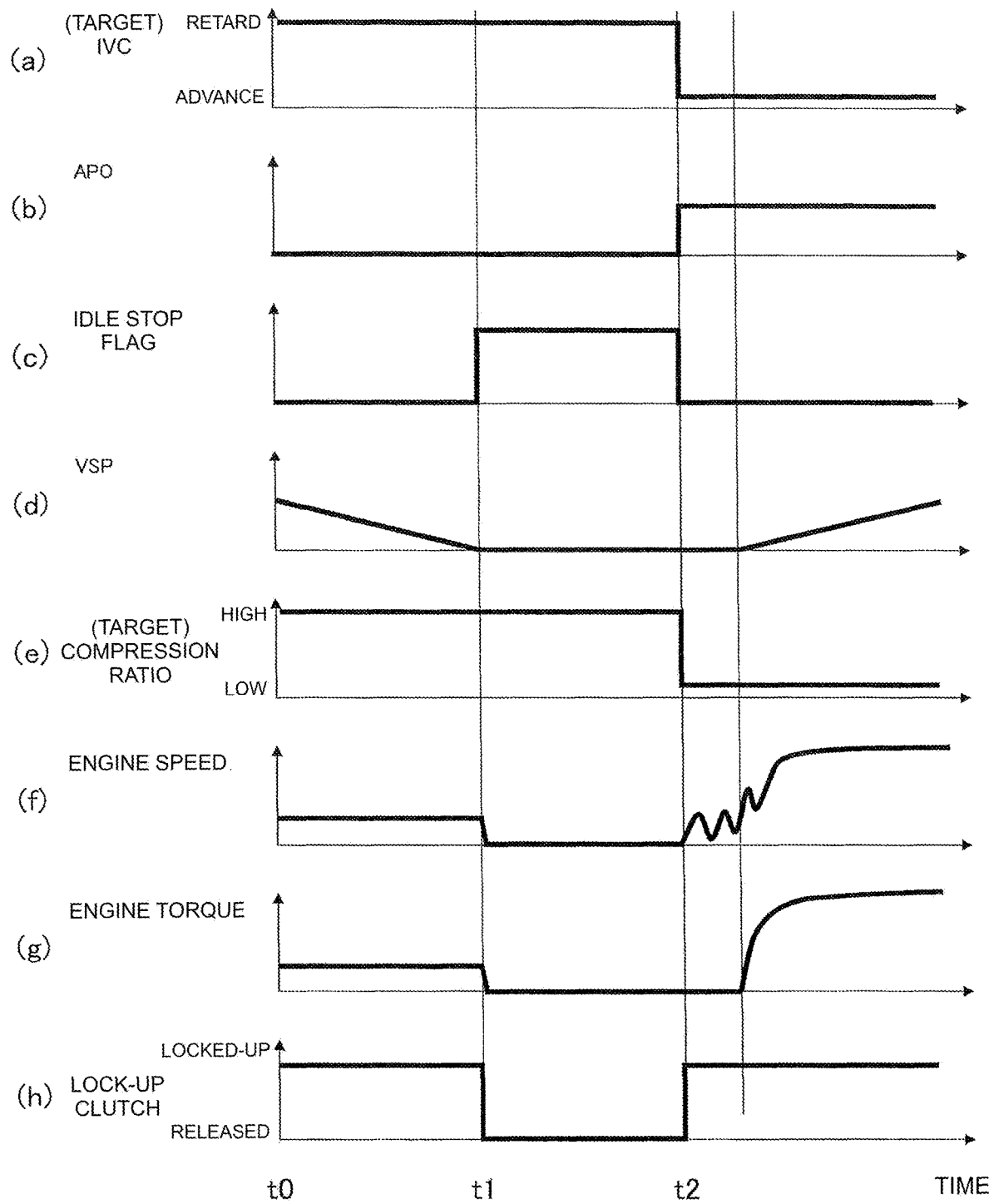
FIG. 5 is a time chart involving idle stop.
Figure 6:
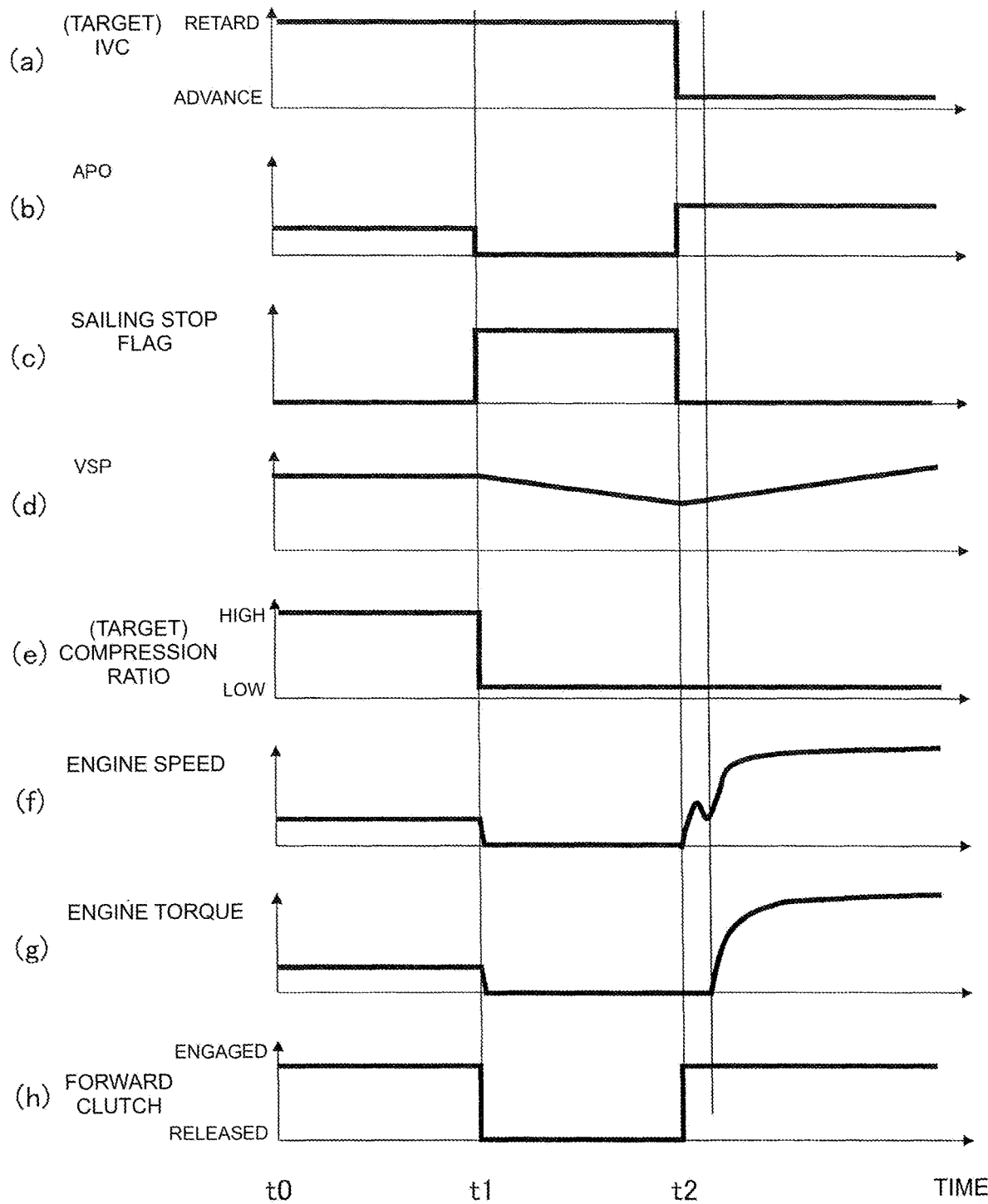
FIG. 6 is a time chart involving sailing stop.

The following describes time charts shown in FIGS. 5 and 6.

FIG. 5 is a time chart showing operation in implementing the idle stop control, in which: chart (a) shows an Intake Valve Closing timing (IVC) of variable valve timing mechanism 3; chart (b) shows accelerator pedal opening degree APO; chart (c) shows an idle stop flag; chart (d) shows vehicle speed VSP; chart (e) shows the target compression ratio with which the actual compression ratio approximately agrees; chart (f) shows engine speed Ne of internal combustion engine 1; chart (g) shows the torque of internal combustion engine 1; and chart (h) shows a control state of lock-up clutch 6 of torque converter 7.

At time instant t0 during vehicle travel, accelerator pedal opening degree APO becomes zero, and vehicle speed VSP starts to decrease gradually. At time instant t1, vehicle speed VSP becomes zero (i.e. the vehicle stops), and the idle stop flag becomes ON. Due to the vehicle stop, the operation of internal combustion engine 1 is automatically stopped. Immediately before the vehicle stop, lock-up clutch 6 is released. The target compression ratio of variable compression ratio mechanism 2 during the idle stop is set to the idle stop restart compression ratio εis being a relatively high compression ratio, wherein the variation of actual compression ratio is implemented before the operation stop of internal combustion engine 1. In an example shown in the drawing, the target compression ratio is set to a high compression ratio from before time instant t1 because of a low engine load, and the compression ratio is approximately constant before and after time instant t1.

Thereafter, at time instant t2, a driver releases the brake pedal and depresses the accelerator pedal for vehicle start. In response to this, the idle stop flag becomes OFF, and internal combustion engine 1 is restarted. After completion of the restart of internal combustion engine 1, the target compression ratio of variable compression ratio mechanism 2 is changed to a target compression ratio depending on the engine load and the engine speed Ne.

As shown in the drawing, the intake valve closing timing (IVC) of variable valve timing mechanism 3 is, although this is not a main focus of the present invention, set to a maximum retard position during the idle stop. Variable valve timing mechanism 3 generally includes a lock mechanism for mechanical lock at the maximum retard position, and is locked at the maximum retard position by the lock mechanism when internal combustion engine 1 is stopped. Accordingly, the restart of internal combustion engine 1 at time instant t2 is implemented with the intake valve closing timing set to the maximum retard position. This configuration of setting the intake valve closing timing to the maximum retard position serves to achieve a high volume efficiency for engine start under low engine load Ne. After time instant t2, the lock at the maximum retard position is released in response to rise in accelerator pedal opening degree APO, and then the intake valve closing timing is controlled depending on the engine operation conditions (i.e. the engine load and the engine speed Ne).

Thus, in restarting the internal combustion engine 1 subsequently to the idle stop, the compression ratio of variable compression ratio mechanism 2 is set to the idle stop restart compression ratio εis being a relatively high compression ratio. This serves to achieve the calm engine restart with minimum amount of fuel and intake air required for the engine restart, and suppress a torque step and a racing in engine speed Ne in engine start and vehicle start.

FIG. 6 is a time chart showing operation in implementing the sailing stop control, in which: chart (a) shows the Intake Valve Closing timing (IVC) of variable valve timing mechanism 3; chart (b) shows accelerator pedal opening degree APO; chart (c) shows a sailing stop flag; chart (d) shows vehicle speed VSP; chart (e) shows the target compression ratio with which the actual compression ratio approximately agrees; chart (f) shows engine speed Ne of internal combustion engine 1; chart (g) shows the torque of internal combustion engine 1; and chart (h) shows a control state of forward clutch 8 of automatic transmission 4.

From time instant t0 until time instant t1, the vehicle is in constant speed travel with a relatively small accelerator pedal opening degree APO. At time instant t1, a driver releases the accelerator pedal, and accelerator pedal opening degree APO becomes zero. Simultaneously with this, the sailing stop start condition described above is satisfied, and the sailing stop flag becomes ON, in this example. This causes forward clutch 8 to be released, and then causes the operation of internal combustion engine 1 to be stopped. The target compression ratio of variable compression ratio mechanism 2 is set to the sailing stop restart compression ratio εss being a relatively low compression ratio, wherein the variation of actual compression ratio is implemented before the operation stop of internal combustion engine 1. The compression ratio before time instant t1 is set to a high compression ratio because of a low engine load.

From time instant t1 until time instant t2, the vehicle is in coasting travel under the sailing stop, and gradually decreases in vehicle speed VSP.

At time instant t2, the sailing stop termination condition is satisfied due to depression of the accelerator pedal by the driver, and then the sailing stop flag becomes OFF, and forward clutch 8 is engaged. Simultaneously with this, fuel supply and ignition in internal combustion engine 1 is restarted, and internal combustion engine 1 is restarted. After the restart of internal combustion engine 1, the target compression ratio of variable compression ratio mechanism 2 is changed to a target compression ratio depending on the engine load and the engine speed Ne. In the example of the drawing, the target compression ratio is set to a relatively low compression ratio approximately same with the sailing stop restart compression ratio εss, because accelerator pedal opening degree APO is relatively large.

The intake valve closing timing (IVC) of variable valve timing mechanism 3 is maintained at the maximum retard position by the lock mechanism during the sailing stop, similarly to the case of idle stop. Accordingly, the engine restart at time instant t2 is implemented with the intake valve closing timing set to the maximum retard position. After time instant t2, in response to rise in accelerator pedal opening degree APO, the lock at the maximum retard position is released, and the intake valve closing timing is controlled depending on the engine operation conditions (i.e. the engine load and the engine speed Ne).

Thus, in restarting the internal combustion engine 1 subsequently to the sailing stop, the compression ratio of variable compression ratio mechanism 2 is set to the sailing stop restart compression ratio εss being a relatively low compression ratio. This allows quick shift to high engine load operation simultaneous with completion of the engine restart, and thereby allows rapid rise in torque. This serves to improve the vehicle in acceleration responsiveness to depression of the accelerator pedal by a driver.

The following describes a second embodiment of control for the sailing stop. According to the above embodiment, as shown in FIG. 6, the sailing stop restart compression ratio εss serving as the target compression ratio of variable compression ratio mechanism 2 is constant and unchanged during the sailing stop. On the other hand, according to the second embodiment, the sailing stop restart compression ratio εss is set variable depending on vehicle speed VSP. Specifically, the sailing stop restart compression ratio εss is set to decrease with increase in vehicle speed VSP. The sailing stop restart compression ratio εss may be characterized to vary continuously with respect to vehicle speed VSP, or may be characterized to vary stepwise with respect to vehicle speed VSP.

Accordingly, when vehicle speed VSP gradually decreases during the coasting travel under the sailing stop, the sailing stop restart compression ratio εss, i.e. the target compression ratio, gradually increases with decrease in vehicle speed VSP. Variable compression ratio mechanism 2 is capable of varying the compression ratio even during the stop of internal combustion engine 1.

In case that the sailing stop restart compression ratio εss is set depending on vehicle speed VSP, the compression ratio at the time of the termination of sailing stop and the restart of internal combustion engine 1 has a value corresponding to vehicle speed VSP and engine speed Ne at that time naturally. This allows the engine restart to be implemented under a more appropriate compression ratio. For example, in case that a driver depresses the accelerator pedal under a relatively high engine speed Ne, the shift to high engine load operation is instantly implemented in conjunction with completion of the engine restart, because the sailing stop restart compression ratio εss has been set to a relatively low compression ratio. This serves to improve the vehicle in acceleration responsiveness in conformance with intention of the driver. In another case that vehicle speed VSP decreases to reach the sailing stop termination vehicle speed due to absence of depression of the accelerator pedal by a driver, and thereby internal combustion engine 1 is restarted, the engine restart is calmly implemented similarly to the case of the engine restart subsequent to idle stop, because the sailing stop restart compression ratio εss has been set to a relatively high compression ratio appropriate for low engine load operation.

The invention claimed is:

1. A control method for an internal combustion engine including a variable compression ratio mechanism structured to vary a mechanical compression ratio of the internal combustion engine, the control method comprising:
    setting a target compression ratio to a basic target compression ratio determined depending on operation conditions of the internal combustion engine, during operation of the internal combustion engine;
    setting the target compression ratio to an idle stop restart compression ratio in preparation for engine restart subsequent to termination of idle stop, in conjunction with implementation of the idle stop in which the operation of the internal combustion engine is automatically stopped to stop rotation of the internal combustion engine, during stop of a vehicle; and
    setting the target compression ratio to a sailing stop restart compression ratio in preparation for engine restart subsequent to termination of sailing stop, in conjunction with implementation of the sailing stop in which during coasting travel of the vehicle the internal combustion engine is automatically detached from a drive system and the operation of the internal combustion engine is automatically stopped to stop the rotation of the internal combustion engine, wherein the sailing stop restart compression ratio is different from the idle stop restart compression ratio.

2. The control method as claimed in claim 1, the control method further comprising:
    varying the mechanical compression ratio to the sailing stop restart compression ratio by the variable compression ratio mechanism before the operation stop of the internal combustion engine, in response to satisfaction of a condition for the sailing stop.

3. The control method as claimed in claim 1, wherein the sailing stop restart compression ratio is lower than the idle stop restart compression ratio.

4. The control method as claimed in claim 1, wherein the sailing stop restart compression ratio is set to decrease with increase in vehicle speed during the sailing stop.

5. A control device for an internal combustion engine including a variable compression ratio mechanism structured to vary a mechanical compression ratio of the internal combustion engine, the control device comprising:
    a basic target compression ratio setting section configured to set a basic target compression ratio depending on operation conditions of the internal combustion engine;
    an idle stop control section configured to implement idle stop in which operation of the internal combustion engine is automatically stopped to stop rotation of the internal combustion engine, during predetermined stop of a vehicle;
    a sailing stop control section configured to implement sailing stop in which the internal combustion engine is automatically detached from a drive system and the operation of the internal combustion engine is automatically stopped to stop the rotation of the internal combustion engine, during predetermined coasting travel of the vehicle; and
    a compression ratio control section configured to control the variable compression ratio mechanism, and set a target compression ratio to:
        the basic target compression ratio, during the operation of the engine;

an idle stop restart compression ratio, in conjunction with the implementation of the idle stop; and
a sailing stop restart compression ratio different from the idle stop restart compression ratio, in conjunction with the implementation of the sailing stop.

\* \* \* \* \*